United States Patent Office 2,959,623
Patented Nov. 8, 1960

2,959,623

STABILIZATION

Blaine O. Pray, Wadsworth, Ohio, and Raymond S. Chisholm, Pittsburgh, Pa., assignors to Columbia-Southern Chemical Corporation, Allegheny County, Pa., a corporation of Delaware No Drawing. Filed Dec. 2, 1958, Ser. No. 777,578

19 Claims. (Cl. 260—652.5)

This invention deals with the stabilization of halogenated hydrocarbons including the normally liquid chlorinated aliphatic hydrocarbons. It is especially relevant to stabilizing metal degreasing solvents, the most prominent of which is trichloroethylene.

Halogenated hydrocarbons such as the normally liquid chlorinated aliphatic hydrocarbons including trichloroethylene and perchloroethylene are well known industrial solvents. They are particularly effective in dissolving greases and oils. Among their larger commercial applications are the degreasing of metals and the dry cleaning of clothing, draperies, carpeting and comparable materials.

A prime consideration in the effective efficient use of these chlorinated aliphatic hydrocarbon solvents is their stability. During storage, handling and use, these solvents manifest pronounced decomposition tendencies. Often they decompose to an extent that their practical usefulness is questionable. Under certain circumstances, the detriments occasioned by rapid and extensive decomposition economically counterbalance any benefits. The degreasing of metals such as aluminum and other light metals is one such circumstance. Improving the stability of chlorinated aliphatic hydrocarbons is therefore of considerable importance.

According to this invention, it has been discovered that halogenated hydrocarbons evidencing decomposition tendencies, notably liquid chlorinated aliphatic hydrocarbons, may be stabilized and protected against decomposition by the use of a salt of a weak acid and an organic substituted ammonium hydroxide. Thus, a chlorinated aliphatic hydrocarbon such as trichloroethylene to which such salt has been added is of substantially improved stability. Moreover, only small amounts of the salt, basis the trichloroethylene, are necessary to realize stabilization.

Adding as little as 0.01 percent or less of the salt by weight of the halogenated hydrocarbon suffices to impart a stabilizing action. Usually recommended, however, is the use of between about 0.01 and 0.3 percent of the salt by weight of the halogenated hydrocarbon. Larger amounts, e.g., up to 5 percent or even more, of the salt may be used, but high cost is a deterrent.

Stabilization of degreasing solvents, primarily trichloroethylene, against decomposition which manifests itself during and as a consequence of degreasing metals, especially light metals such as aluminum, is one determining factor in the practical value of degreasing. Under the conditions of metal degreasing, degreasing solvents typified by trichloroethylene decompose with alarming rapidity unless properly stabilized. By adding a salt of a weak acid and an organic substituted ammonium hydroxide to a degreasing solvent, intolerable decomposition arising during metal degreasing may be alleviated.

Among the salts which are of particular value according to this invention are those of weak acids (organic or inorganic) having an ionization constant at 25° C. less than $2 \times 10^{-2}$ and organic substituted ammonium hydroxides having at least one of the hydrogen atoms directly linked to the ammonium nitrogen replaced by an organic group linked to the nitrogen by a carbon atom. Thus, these salts may be viewed as those which would be obtained by the theoretical reaction:

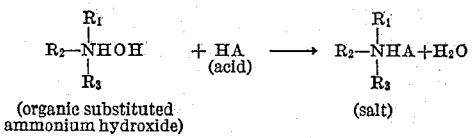

(organic substituted ammonium hydroxide)     (salt)

$R_1$ representing an organic group, while both $R_2$ and $R_3$ each denote either an organic group or hydrogen. Usually these organic groups are alkyl groups of 1 to 8 carbon atoms, although cycloalkyl, aryl, heterocyclic, alkenyl and aralkyl groups as well as organic groups comprised of chains (aliphatic, cycloaliphatic and aromatic) principally constituted of carbon atoms (e.g., residues of ethers, esters, etc.) are included. The presence of halogen such as chlorine halogenated alkyl groups is not precluded.

Salts of weak organic acids comprise one group of stabilizers. Salts of both carboxylic acids (aliphatic and aromatic) and phenolic acids are useful. Typical of these weak organic acids are the aliphatic monohydric carboxylic acids such as formic, acetic, chloroacetic, propionic, alpha and beta chloropropionic, n-butyric, caproic, glycollic, lactic, thioglycollic, caprylic, pelargonic and like weak organic acids. Among the aromatic carboxylic acids are benzoic, o-toluic, m-toluic, p-toluic, m-chlorobenzoic, p-chlorobenzoic, o-chlorobenzoic, m-bromobenzoic, p-bromobenzoic and salicylic. The weakly acidic phenols such as phenol, the cresols, the monochlorophenols and other mono- and polyhalophenols, catechol and the like also form salts of value. Useful, thus, are salts of any such weak organic acid, especially those weak acids having up to 10 carbon atoms.

Also useful are ammonium salts of weak inorganic acids such as nitrous, carbonic, arsenic, selenious and stannic. Of these, the nitrite salts (salts of nitrous acid) are preferred.

These stabilizers may be characterized as salts of weak acids and organic substituted ammonium hydroxides of the theoretical formula:

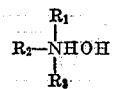

$R_1$, $R_2$ and $R_3$ being as before defined. Salts where both $R_1$ and $R_2$ are organic groups such as alkyl groups of 1 to 8 carbon atoms and $R_3$ is hydrogen are especially ideal. However, $R_1$ and $R_2$ may represent a cyclic constituent in which the nitrogen is a ring member of a cyclic organic group, e.g., wherein the salts are of the theoretical pyrrolinium hydroxide, morpholinium hydroxide, isoxazinium hydroxide, piperazinium hydroxide and the like. A typical salt of this character is N-methylmorpholinium acetate.

Some of these salts which may be mentioned specifically by way of illustration include diisopropylammonium formate, diisopropylammonium acetate, diisopropylammonium benzoate, diisopropylammonium ortho-chlorophenoxide, di-n-butylammonium acetate, di-n-butylammonium benzoate, diisobutylammonium phenoxide, di-n-propylammonium acetate, di-n-propylammonium propionate, propylammonium acetate, tri-propylammonium acetate, butylammonium acetate, tri-butylammonium benzoate, amylammonium benzoate, isopropylammonium benzoate, cyclohexylammonium benzoate, dicyclohexylammonium benzoate, diethanolammonium benzoate, diethanolammonium acetate, triethanolammonium benzoate, N-ethylmorpholinium benzoate, pyridinium benzoate, diisopropylammonium 2-ethylbutyrate, isoamylammonium salicylate, diisopropylammonium azelate, cyclohexylammonium formate, diisopropylammonium phenoxide, cyclohexylammonium cyclohexylcarboxylate, dicyclohexylammonium 2-ethylhexanoate, isopropylammonium nitrite, cyclohexylammonium nitrite, dicyclohexylammonium nitrite, diisopropylammonium nitrite, diisobutylammonium nitrite, triethyl ammonium nitrite, isopropylammonium carbonate, dicyclohexylammonium carbonate, diisobutylammonium carbonate, diisopropylammonium carbonate, diisopropylammonium borate, dicyclohexylammonium borate, triethylammonium borate, triisopropylammonium carbonate, and di-n-butylammonium carbonate.

While these salts may be used alone in the stabilization, frequently additional materials are included in trichloroethylene or other halogenated hydrocarbon solvent. Different stabilizer, anti-oxidants or other additives may be added along with the salt. These additives may augment or compliment the stabilizing action of these salts.

Aromatic compounds containing a phenolic hydroxyl group linked directly to a ring carbon such as phenol, thymol, catechol, para-cresol, guaicol, isoeugenol, eugenol, methylsalicylate and like phenols generally boiling between 180° C. and 250° C. may be present, usually to function as an anti-oxidant.

A wide variety of amines may also be present without detracting from the stabilizing action of the salts. Amines which may be included are typified by diethylamine, triethylamine, dipropylamine, dibutylamine, diisobutylamine, triisopropylamine, diethanolamine, triethanolamine, N-methylmorpholine, methylpyrrole, beta-picoline, pyridine, aniline and the like.

Organic epoxides (oxiranes), e.g., compounds having a

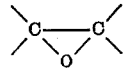

group, may be present also. Typical of such epoxides are ethylene oxide, 1,2-propylene oxide, 1,2-butylene oxide, 2,3-butylene oxide, butadiene monoxide, butadiene dioxide, epichlorohydrin, glycidol, isobutylene oxide, 1,2-octylene oxide, styrene oxide, cyclohexene oxide and cyclopentene oxide.

Still other additives may be present including olefinically unsaturated compounds like pinene, amylene and diisobutylene, organic esters of monocarboxylic acids such as ethyl acetate, alcohols such as methanol, ethanol, butanol, propargyl alcohol, allyl alcohol, etc.

As a general rule, the concentration of any individual additive is below 2 percent by weight of the halogenated hydrocarbon, more usually 0.001 to 0.5 percent by weight. The total concentration of all additives is below 5 percent by weight and usually less than 2 percent by weight.

The following example illustrates the stabilizing effect of weak acid salts of organic substituted ammonium salts:

EXAMPLE

Trichloroethylene samples to which were added representative weak acid salts of organic substituted ammonium hydroxide were tested by accepted procedures. The following data demonstrating the stability imparted by the use of these salts was obtained:

Table I

| Stabilizer Composition | Stabilizer Concentration, Percent by Weight of Trichloroethylene | Acidity[1] Alkalinity | | Standard Stability | | | | |
|---|---|---|---|---|---|---|---|---|
| | | pH | Titer | Hours | pH | Titer | Color | HCl Evolved |
| Diisopropylammonium Acetate | 0.01 | 6.3 | 0.45 | 72 | 8.5 | 1.6 | light amber | nil. |
| Thymol | 0.01 | | | | | | | |
| Mixed Butylene Oxides[2] | 0.25 | | | | | | | |
| Glycidol | 0.05 | | | | | | | |
| Ethyl Acetate | 0.25 | | | | | | | |
| Diisobutylene | 0.2 | | | | | | | |
| Diisobutylammonium Acetate | 0.01 | 6.1 | 0.6 | 72 | 7.6 | 0.7 | medium amber | nil. |
| Thymol | 0.01 | | | | | | | |
| Mixed Butylene Oxides[2] | 0.25 | | | | | | | |
| Glycidol | 0.05 | | | | | | | |
| Ethyl Acetate | 0.25 | | | | | | | |
| Diisobutylene | 0.2 | | | | | | | |
| Di-n-propylammonium Acetate | 0.01 | 6.0 | 0.5 | 72 | 7.6 | 0.6 | do | nil. |
| Thymol | 0.01 | | | | | | | |
| Mixed Butylene Oxides[2] | 0.25 | | | | | | | |
| Glycidol | 0.05 | | | | | | | |
| Ethyl Acetate | 0.25 | | | | | | | |
| Diisobutylene | 0.2 | | | | | | | |
| Diisopropylammonium Formate | 0.01 | 5.4 | 0.7 | 72 | 8.6 | 1.1 | do | nil. |
| Thymol | 0.01 | | | | | | | |
| Mixed Butylene Oxides[2] | 0.25 | | | | | | | |
| Glycidol | 0.05 | | | | | | | |
| Ethyl Acetate | 0.25 | | | | | | | |
| Diisobutylene | 0.2 | | | | | | | |
| Diisopropylammonium Nitrite | 0.01 | 6.7 | 0.2 | 72 | 6.5 | 0.4 | do | nil. |
| Thymol | 0.01 | | | | | | | |
| Mixed Butylene Oxides[2] | 0.25 | | | | | | | |
| Glycidol | 0.05 | | | | | | | |
| Ethyl Acetate | 0.25 | | | | | | | |
| Diisobutylene | 0.2 | | | | | | | |
| Dicyclohexylammonium Nitrite | 0.01 | 6.2 | 0.5 | 72 | 7.4 | 0.9 | do | nil. |
| Mixed Butylene Oxides[2] | 0.25 | | | | | | | |
| N-Methylmorpholinium Acetate | 0.01 | 5.7 | 0.9 | 96 | 7.7 | 0.5 | do | nil. |
| Thymol | 0.01 | | | | | | | |
| Mixed Butylene Oxides[2] | 0.25 | | | | | | | |
| Glycidol | 0.05 | | | | | | | |
| Ethyl Acetate | 0.25 | | | | | | | |
| Diisobutylene | 0.2 | | | | | | | |
| Diisopropylammonium 2-chlorophenoxide | 0.017 | 8.8 | 1.5 | 72 | 8.4 | 1.2 | do | nil. |
| Thymol | 0.01 | | | | | | | |
| Mixed Butylene Oxides[2] | 0.25 | | | | | | | |
| Glycidol | 0.05 | | | | | | | |
| Ethyl Acetate | 0.25 | | | | | | | |
| Diisobutylene | 0.2 | | | | | | | |

[1] This test consists of placing a 25 milliliter trichloroethylene sample in a beaker containing 25 milliliters of neutral distilled water and stirring while reading the glass calomel electrode pH value with a meter. The material was titrated with 0.01 N-hydrochloric acid or 0.01 N-sodium hydroxide until the neutral pH is reached. The milliliters of hydrochloric acid or sodium hydroxide required is the titer.

[2] Mixed butylene oxides comprise 70 percent 1,2-butylene oxide and 30 percent 2,3-butylene oxide.

The Standard Stability test is designed to evaluate the efficiency of the stabilizer under especially rigorous conditions comparable to those found in shop usage. Procedurally, it involves placing 250 milliliter solution of 87.5 percent by volume of the trichloroethylene including the stabilizer in 12.5 volume percent Houghton H3105 drawing oil (sold by E. F. Houghton and Company) in a narrow mouth flask. Five grams of zinc and 5 grams of aluminum chips are added and the solution refluxed for the reported time period passing one bubble per second of air at 25° C. saturated with water through the solution.

The solution is observed for color. At the end of the 72 hours, a 25 milliliter portion of the trichloro ethylene is titrated for acidity-alkalinity as described heretofore. The evolution of any HCl is determined by passing uncondensed gases leaving the refluxing condenser into a nitric acid acidulated silver nitrate fluid.

Although these salts are admirably suited to the stabilization of trichloroethylene and other degreasing solvents, they are of use with respect to other normally liquid halogenated hydrocarbons, especially the liquid chlorinated aliphatic hydrocarbons of 1 to 3 carbons such as chloroform, carbon tetrachloride, methyl chloroform, ethylene dichloride, and perchloroethylene.

While this invention has been described by reference to specific details of certain embodiments, it is not intended that the invention be construed as limited to such details except insofar as they appear in the appended claims.

We claim:

1. A composition comprising a liquid halogenated hydrocarbon containing a stabilizing concentration of a salt of a weak acid and an organic substituted ammonium hydroxide.

2. A composition comprising a liquid chlorinated hydrocarbon containing a stabilizing concentration of a salt of a weak acid and an organic substituted ammonium hydroxide.

3. A composition comprising trichloroethylene and a stabilizing concentration of a salt of a weak acid and an organic substituted ammonium hydroxide.

4. A degreasing solvent composition comprising trichloroethylene and a salt of a weak acid and an organic substituted ammonium hydroxide, said salt being present in a stabilizing concentration of between about 0.01 and 2 weight percent of the trichloroethylene.

5. A composition comprising a liquid halogenated hydrocarbon containing a stabilizing concentration of a salt of a weak organic acid and an organic substituted ammonium hydroxide.

6. A composition comprising a liquid halogenated hydrocarbon containing a stabilizing concentration of a salt of a weak inorganic acid and an organic substituted ammonium hydroxide.

7. A composition comprising trichloroethylene and a stabilizing concentration of a salt of weak organic acid and an organic substituted ammonium hydroxide.

8. The composition of claim 7 wherein the weak acid is a carboxylic acid.

9. The composition of claim 7 wherein the weak acid is a phenol.

10. A composition comprising trichloroethylene containing a stabilizing concentration of a salt of a weak inorganic acid having an ionization constant less than $2 \times 10^{-2}$ and an organic substituted ammonium hydroxide.

11. The composition of claim 10 wherein the weak acid is nitrous acid and the salt a nitrite.

12. The method of stabilizing a liquid halogenated hydrocarbon which comprises adding thereto a stabilizing quantity of a salt of a weak acid and an organic substituted ammonium hydroxide.

13. The method of stabilizing a liquid chlorinated hydrocarbon which comprises adding thereto a stabilizing quantity of a salt of a weak acid and an organic substituted ammonium hydroxide.

14. The method of stabilizing trichloroethylene which comprises adding thereto a stabilizing quantity of a salt of a weak acid and an organic substituted ammonium hydroxide.

15. The method of claim 14 wherein the weak acid is an inorganic acid.

16. The method of claim 14 wherein the weak acid is an organic acid having an ionization constant of less than $2 \times 10^{-2}$.

17. The method of claim 14 wherein the weak acid is nitrous acid.

18. The method of claim 14 wherein the weak acid is a weak carboxylic acid.

19. The method of claim 14 wherein the weak acid is a phenol.

References Cited in the file of this patent

UNITED STATES PATENTS 2,094,367    Missbach _____ Sept. 28, 1937